United States Patent
Argue et al.

(10) Patent No.: US 10,846,778 B2
(45) Date of Patent: *Nov. 24, 2020

(54) RECIPE-SUGGESTION APPARATUS AND METHOD

(71) Applicant: Walmart Apollo, LLC, Bentonville, AR (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 515 days.

This patent is subject to a terminal disclaimer.

(21) Appl. No.: 15/359,410

(22) Filed: Nov. 22, 2016

(65) Prior Publication Data

US 2017/0076355 A1   Mar. 16, 2017

Related U.S. Application Data

(62) Division of application No. 13/688,134, filed on Nov. 28, 2012, now Pat. No. 9,536,237.

(51) Int. Cl.
   *G06Q 30/06* (2012.01)
   *G06Q 20/20* (2012.01)
(52) U.S. Cl.
   CPC ......... *G06Q 30/0633* (2013.01); *G06Q 20/20* (2013.01); *G06Q 20/202* (2013.01); *G06Q 30/0631* (2013.01)
(58) Field of Classification Search
   None
   See application file for complete search history.

(56) References Cited

U.S. PATENT DOCUMENTS

| 5,832,446 | A | 11/1998 | Neuhaus |
| 6,434,530 | B1 | 8/2002 | Sloane et al. |
| 7,762,458 | B2 * | 7/2010 | Stawar ............ B62B 3/1408 235/383 |
| 8,200,548 | B2 | 6/2012 | Wiedl |
| 8,504,440 | B1 | 8/2013 | Kolawa et al. |
| 9,165,320 | B1 * | 10/2015 | Belvin ............ G06Q 30/0633 |
| 2002/0046060 | A1 | 4/2002 | Hoskyns et al. |

(Continued)

FOREIGN PATENT DOCUMENTS

| CN | 202736122 U | 2/2013 |
| WO | 2012116395 A1 | 9/2012 |

*Primary Examiner* — Allen C Chein
*Assistant Examiner* — Denisse Y Ortiz Roman
(74) *Attorney, Agent, or Firm* — Bryan Cave Leighton Paisner LLP

(57) ABSTRACT

A computer-implemented method is disclosed for suggesting recipes. Within the method, one or more point-of-sale transactions may be conducted. The transactions may involve a computer system and a customer possessing a mobile computing device. The computer system may store receipt data documenting the transactions. The computer system may also receive a request from the mobile computing device for one or more recipes, analyze the receipt data to identify at least one of the food patterns and food preferences of the customer, and identify one or more recipes corresponding to at least one of the food patterns and food preferences. The computer system may then pass the one or more recipes to the mobile computing device.

22 Claims, 7 Drawing Sheets

(56) References Cited

U.S. PATENT DOCUMENTS

| | | |
|---|---|---|
| 2006/0199155 A1 | 9/2006 | Mosher |
| 2007/0094090 A1 | 4/2007 | Jenkins et al. |
| 2007/0141540 A1* | 6/2007 | Borg .................... G06Q 30/02 434/127 |
| 2009/0009815 A1 | 1/2009 | Karasik et al. |
| 2009/0037288 A1 | 2/2009 | Christensen |
| 2009/0134151 A1 | 5/2009 | Bogatin et al. |
| 2009/0144081 A1 | 6/2009 | Harlan |
| 2010/0292998 A1 | 11/2010 | Bodlaender et al. |
| 2011/0055044 A1* | 3/2011 | Wiedl .................... G06Q 30/02 705/26.5 |
| 2011/0213667 A1 | 9/2011 | Ierullo |
| 2011/0225050 A1 | 9/2011 | Varghese |
| 2012/0016781 A1 | 1/2012 | Hashimoto |
| 2012/0136751 A1* | 5/2012 | Ochtel ................ G06Q 30/0633 705/26.8 |
| 2012/0136864 A1 | 5/2012 | Ochtel |
| 2012/0280040 A1* | 11/2012 | Carney .............. G06Q 20/0453 235/383 |
| 2012/0317505 A1 | 12/2012 | Schwartz et al. |
| 2013/0149675 A1 | 6/2013 | Slone et al. |
| 2013/0149676 A1 | 6/2013 | Tokuda et al. |
| 2013/0219339 A1* | 8/2013 | Wiese ................. G06F 3/04847 715/833 |
| 2013/0224694 A1* | 8/2013 | Moore .................. G16H 20/60 434/127 |
| 2014/0095479 A1 | 4/2014 | Chang et al. |

\* cited by examiner

RECIPE-SUGGESTION APPARATUS AND METHOD

CROSS-REFERENCE TO RELATED APPLICATIONS

This application is a divisional application of U.S. patent application Ser. No. 13/688,134, filed Nov. 28, 2012, the disclosure of which is hereby incorporated by reference in its entirety.

BACKGROUND

Field of the Invention

This invention relates to point-of-sale systems and more particularly to systems and methods for analyzing electronic receipt data and suggesting recipes relevant thereto.

Background of the Invention

Many point-of-sale (POS) systems currently in use today do not support important emerging technologies, services, and marketing opportunities. For example, many POS systems are limited in their ability to collect and analyze electronic receipt data. As a result, those POS systems cannot effectively implement many novel methods and services surrounding such data. Accordingly, what is needed is an apparatus and method expanding the ability of a wide variety of POS systems and supporting computer systems, include legacy POS systems, to use electronic receipt data to benefit customers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
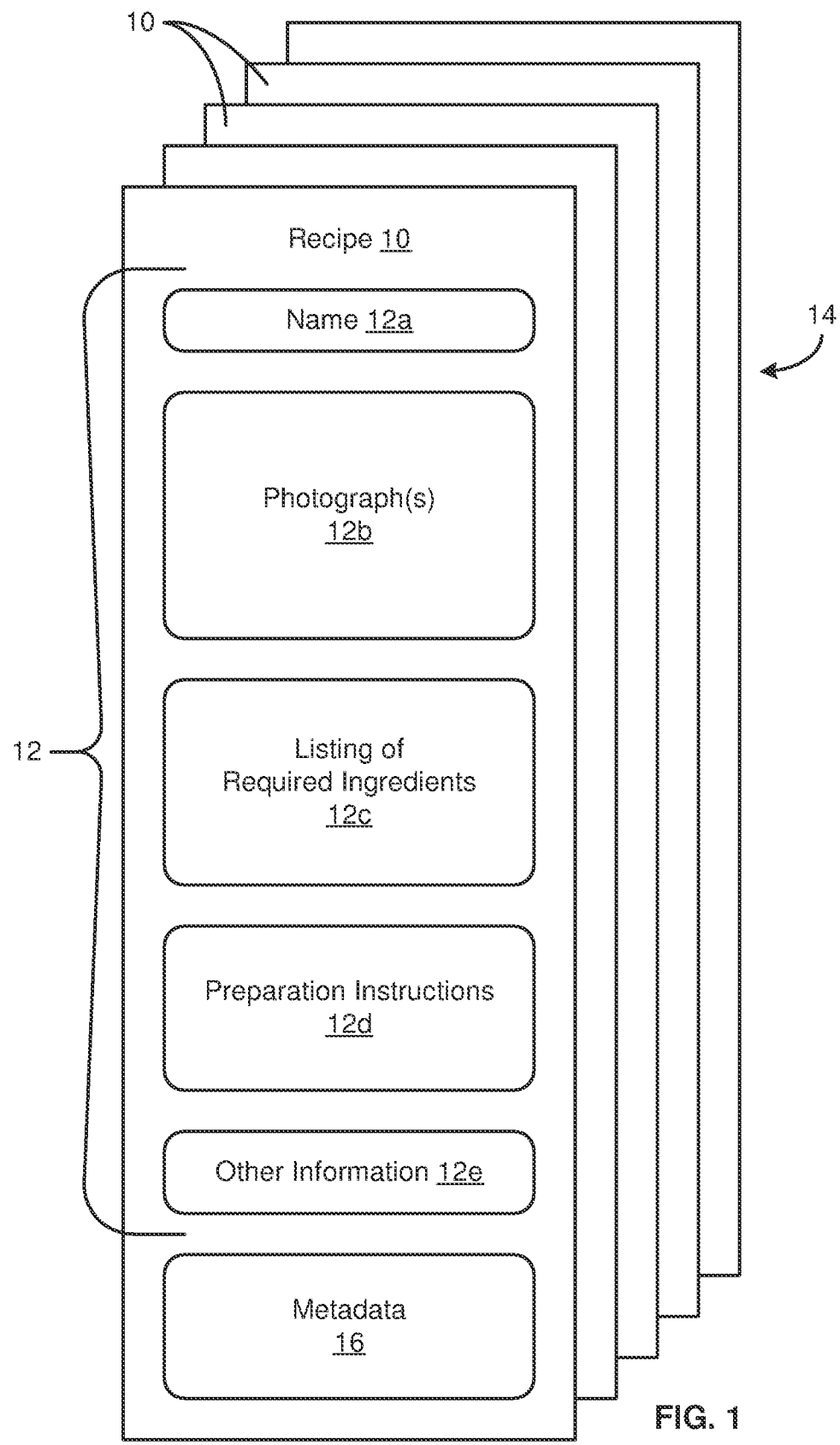
FIG. 1 is a schematic block diagram of one embodiment of a recipe in accordance with the present invention.

Referring to FIG. 1, in selected embodiments, one or more computers, computers systems, mobile computing devices, or the like or a combination or sub-combination thereof may support, enable, or administer a recipe-suggestion apparatus and/or method. A recipe 10 may be defined as a collection of information 12 describing how to prepare a particular culinary dish. By following a recipe 10, even an inexperienced preparer can repeatably produce a quality dish. As a result, recipes 10 are particularly useful when a preparer would like to expand his or her repertoire, add variety to his or her diet, or take on a new challenge.

Just as there is a substantially unlimited number of dishes, there is also a substantially unlimited number of recipes 10. The challenge is often not to find a recipe 10, but rather to find a user-friendly recipe 10 describing how to prepare a quality dish that is relevant to one's tastes, preferences, skill level, and the like. Accordingly, selected embodiments in accordance with the present invention may facilitate the process by working to find and present or suggest quality recipes that are likely relevant to the corresponding individual. For example, certain embodiments may analyze a customer's receipt data to identify one or more purchase patterns or cuisine preferences that may be used in suggesting a recipe relevant to the customer.

Selected embodiments in accordance with the present invention may utilize one or more collections 14 of recipes 10. Such collections 14 may be obtained in any suitable manner. For example, in selected embodiments, a collection 14 may be developed, researched, and/or compiled by a retailer (e.g., a retailer whose receipt data is being analyzed to assist in identifying relevant recipes) or an agent thereof. Alternatively, a collection 14 may be obtained (e.g., licensed) from a third party (e.g., a party independent from the retailer) such as a reputable chef, culinary publisher, culinary school, or the like.

A collection 14, and the recipes 10 contained therein, may have any suitable form. For example, selected embodiments may leverage a collection 14 of recipes 10 contained and indexed within a recipe database. The various recipes 10 contained within such a collection 14 may comprise any suitable arrangement of preparation information 12 or other data. For example, in certain embodiments, each recipe 10 of a collection 14 may include a name 12a of the dish, one or more photographs 12b of the dish at various stages of preparation and/or in finished form, a listing 12c of required ingredients with corresponding quantities or proportions, preparation instructions 12d or information 12d (e.g., a list of necessary equipment, a description of an environment needed to prepare the dish, a list of preparation steps, or the like), other information 12e (e.g., an indication of how much time it will take to prepare the dish, a number of servings that the recipe 10 will provide, nutritional information, etc.), or the like or a combination of sub-combination thereof.

Additionally, in selected embodiments, a recipe 10 may include metadata 16. Metadata 16 may be described as "content about content." Accordingly, in the context of a recipe 10, metadata 16 may comprise information about the recipe 10. For example, metadata 16 included within a recipe 10 may be information characterizing an ethnic or geographic origin or influence represented in a dish (e.g., type of cuisine), whether the dish is spicy or mild, whether the dish is sweet or savory, or the like. Metadata 16 may also include information regarding whether the dish is low in sodium, low in fat, low in carbohydrates, gluten free, vegetarian, strict vegetarian (e.g., vegan), or the like.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
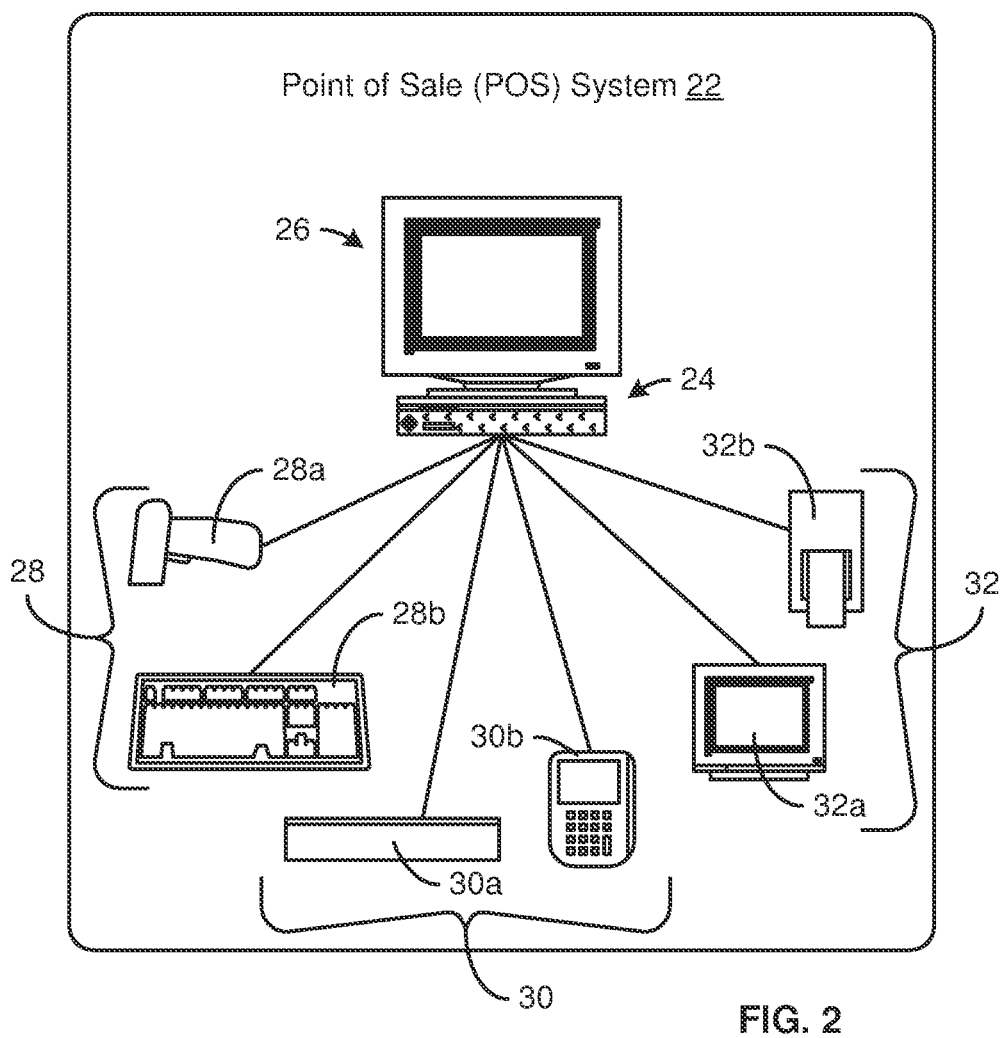
FIG. 2 is a schematic block diagram of one embodiment of a point-of-sale (POS) system for implement methods in accordance with the present invention.

Referring to FIG. 2, in selected embodiments, the hardware, software, or hardware and software of a POS system 22 may be configured to implement one or more methods in accordance with the present invention. A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 3:
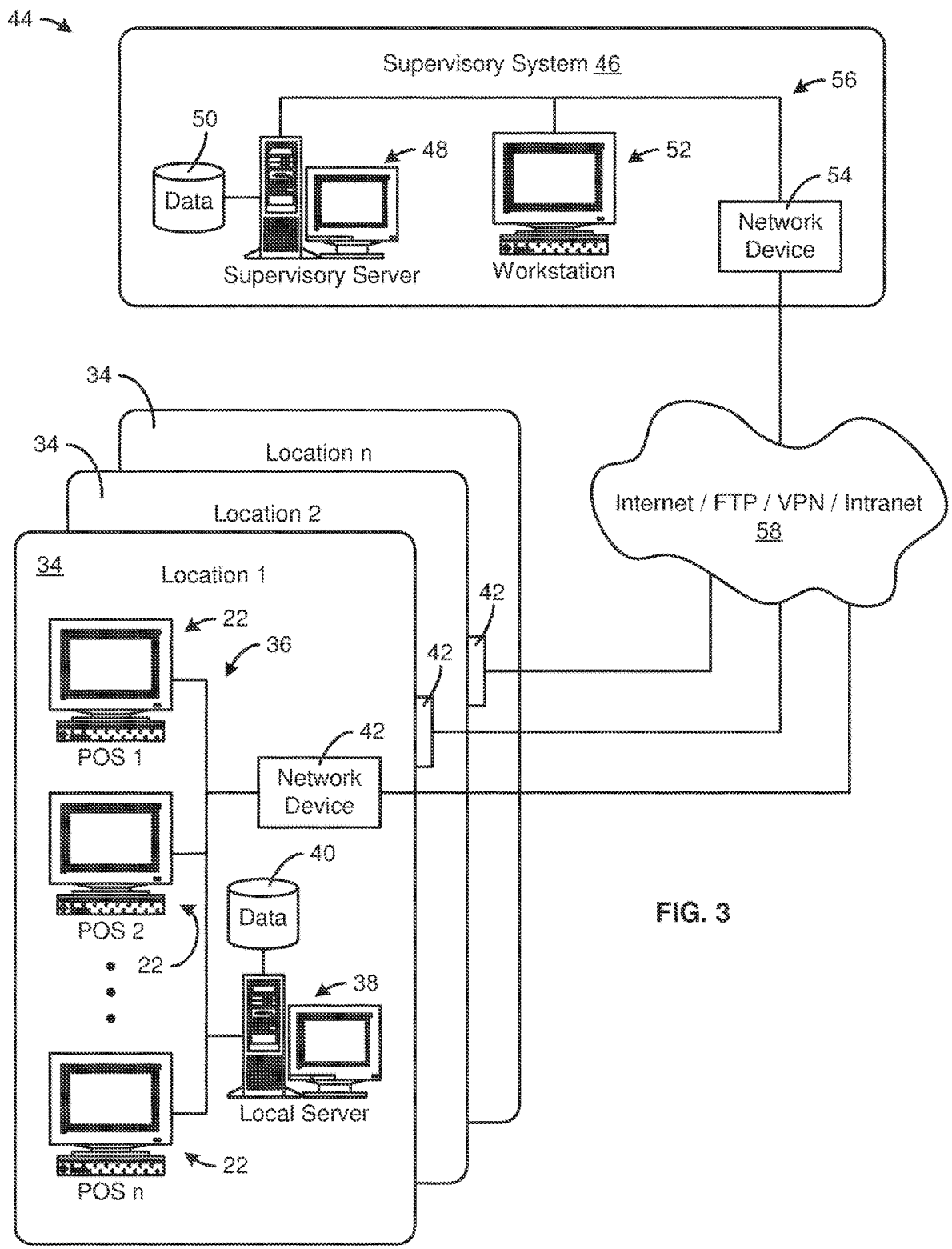
FIG. 3 is a schematic block diagram of one embodiment of multiple POS systems in accordance with the present invention operating in the context of an enterprise-wide system.

Referring to FIG. 3, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

Figure 4:
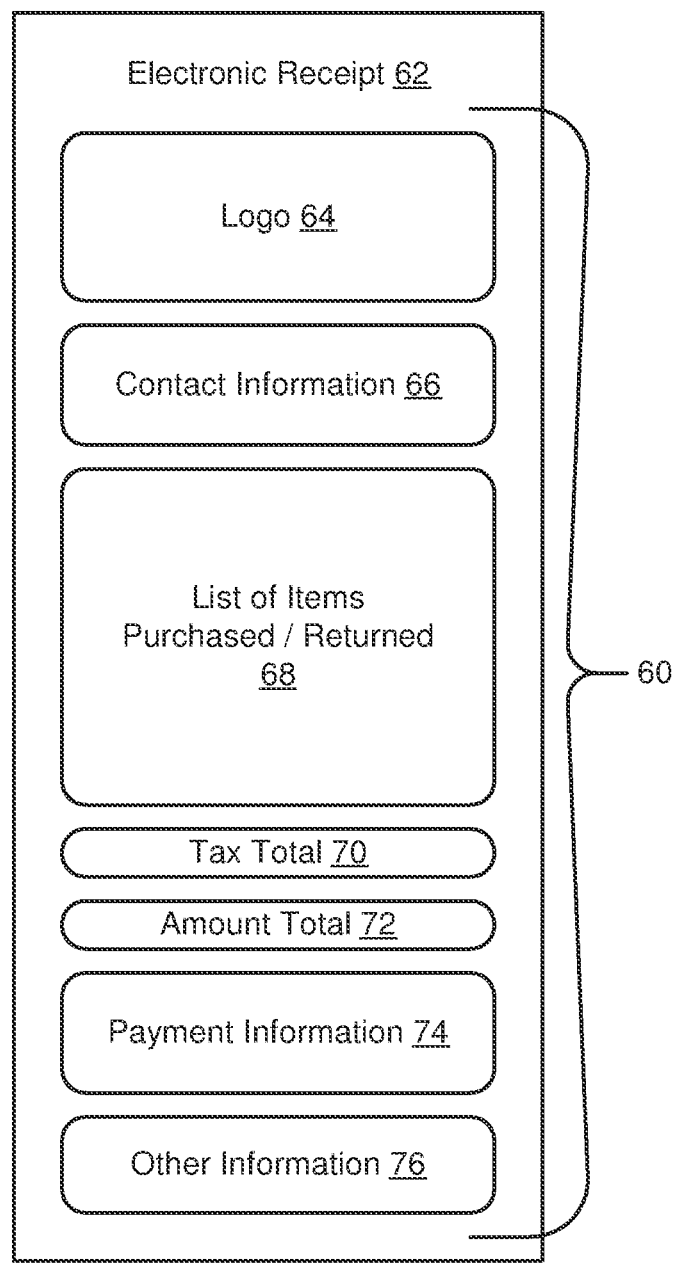
FIG. 4 is a schematic block diagram of one embodiment of a receipt in accordance with the present invention.

Referring to FIG. 4, a POS system 22 may collect and/or generate receipt data 60. Receipt data 60 may document a transaction (e.g., sale or return) carried out by a POS system 22. Receipt data 60 may be presented or displayed to a customer in the form of an electronic (e.g., paperless) receipt 62. In selected embodiments, receipt data 60 may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

In selected embodiments, receipt data 60 and an electronic receipt 62 may include a logo 64, contact information 66, a list 68 of items purchased or returned, a total 70 indicating the sales tax assessed or returned, a total 72 indicating the amount paid or returned, payment information 74, other information 76, or the like or combinations or sub-combinations thereof.

A logo 64 may reinforce the brand and image of the associated entity within the mind of a consumer. By including contact information 66 on an electronic receipt 62, an entity may ensure that a customer has ready access to one or more physical addresses, Internet address, telephone numbers, facsimile numbers, hours of operation, or the like or combinations or sub-combinations thereof. One or more of a list 68 of items purchased or returned, a total 70 indicating the sales tax assessed or returned, a total 72 indicating the amount paid or returned, and payment information 74 (e.g., date of transaction, an indication of method of payment, an indication of which credit or debit card was used, etc.) may be included to document important details of a transaction.

Other information 76 may be included within an electronic receipt 62 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

An electronic receipt 62 may be presented by a computing device of a customer in any suitable layout or format. For example, the receipt data 60 forming an electronic receipt 62 may simply be presented as a textual list. Alternatively, an electronic receipt 62 may follow the form of a paper receipt. That is, the electronic receipt 62 may comprise a virtual representation or layout substantially matching what a comparable paper receipt would look like.

The manner in which an electronic receipt 62 is presented or displayed on a computing device of a customer may be completely dictated by the computer system delivering the receipt data 60 thereto. Alternatively, the computing device of the customer may have an application (e.g., a receipt manager, accounting program, budgeting program, or the like) installed thereon. Such an application may partially or completely control the layout or format of an electronic receipt 62 displayed therewith or therethrough. For example, a computer system may supply receipt data 60, while the application installed on the computing device of the customer supplies the layout or formatting.

Figure 5:
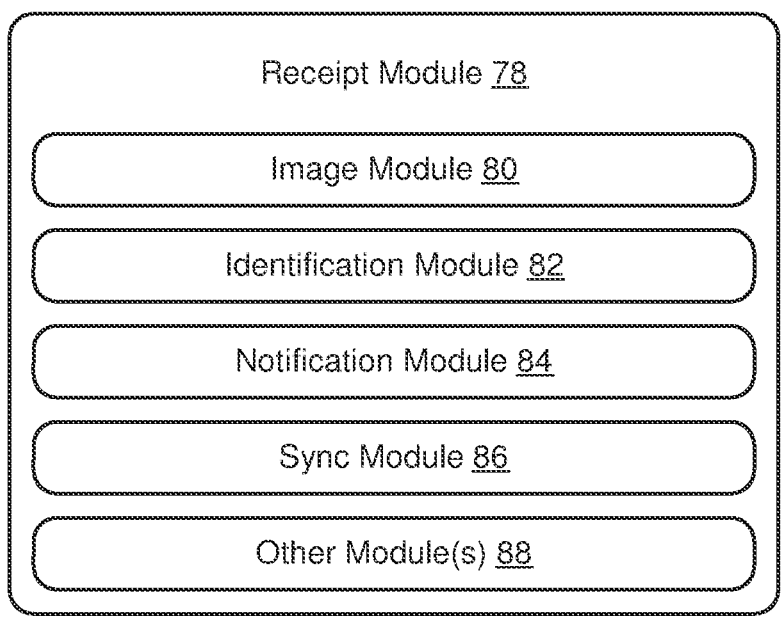
FIG. 5 is a schematic block diagram of one embodiment of a receipt module in accordance with the present invention.

Referring to FIG. 5, a computer system in accordance with the present invention may deliver receipt data 60 to a computing device of a customer in any suitable manner. In selected embodiments, a receipt module 78 may enable or support such delivery. A receipt module 78 may include any suitable arrangement of sub-components or modules. In certain embodiments, a receipt module 78 may include an image module 80, identification module 82, notification module 84, synchronization module 86, one or more other modules 88 as desired or necessary, or the like or some combination or sub-combination thereof.

An image module 80 may assemble, generate, or obtain an advertisement comprising a call to action. A call to action may invite or motivate a customer to take a particular step or action. For example, a call to action may invite or motive a consumer to download receipt data 60. To increase the likelihood that a consumer will respond favorably to the call to action, an advertisement may include an enabler facilitating the desired step or action. For example, in selected embodiments, an advertisement may include a machine-readable code. By scanning the code (e.g., scanning the code using a camera on a mobile telephone, tablet computer, or the like), a consumer may import receipt data 60 encoded within the code. Alternatively, scanning the code may initiate the download of receipt data 60.

For example, a machine-readable code may be encoded with a URL. In addition to designating a particular resource, a URL may also include a transaction identification (ID). Accordingly, after an appropriate application is launched and a machine-readable code is scanned, a URL may be passed from a customer (e.g., from a mobile telephone of a customer) to an Internet Service Provider (e.g., a telecommunications provider). As a result, an appropriate resource within a computer system may be accessed and receipt data may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 82 may be tasked with requesting, collecting, and/or communicating identification information linking a customer associated with a transaction with one or more records stored within a computer system. For example, as part of a transaction carried out at a POS system 22, an identification module 82 may request, collect, and/or communicate identification information linking a transaction to a particular computing device corresponding to the customer participating in the transaction. Thus, information corresponding to the transaction may be passed to the customer via the particular computing device.

An identification module 82 may request, collect, and/or communicate one or more types of identification information. For example, in selected embodiments, an identification module 82 may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number, payment number, membership number, or the like at a POS system 22. For example, while a cashier is processing a transaction, a customer may be prompted via a card reader 30*b*, customer-facing display 32*a*, or the like to enter (e.g., type in using the card reader 30*b*) a mobile telephone number corresponding to the customer. Alternatively, a cashier may type in a telephone number corresponding to the customer.

Once the identification information is received, it may be used directly (e.g., used directly to pass receipt data 60 to a computing device of a corresponding customer). Alternatively, or in addition thereto, the identification information may tie or link a current transaction to one or more previously stored computer records. For example, within such records, a computer system may find the information necessary to identify and communicate with a computing device or account of a corresponding customer. Alternatively, or in addition thereto, such records may enable a computer system to tie or link a current transaction to an appropriate computing device or account.

A notification module 84 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt 62 is available for download).

A synchronization module 86 may support or enable one way or two way data communication between a computer system and a computing device. For example, a synchronization module 86 may support or enable the passing of receipt data 60 from a computer system to a computing device. A synchronization module 86 may also enable certain data received from a computing device to be incorporated within or used by a computer system. For example, one or more user preferences (e.g., notification preferences) may be communicated to a computer system from an application resident on a computing device.

The various functions or modules of a receipt module 78 may be enacted or implemented by any suitable system or component thereof. For example, in selected embodiments, one or more functions or modules of a receipt module 78 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 6:
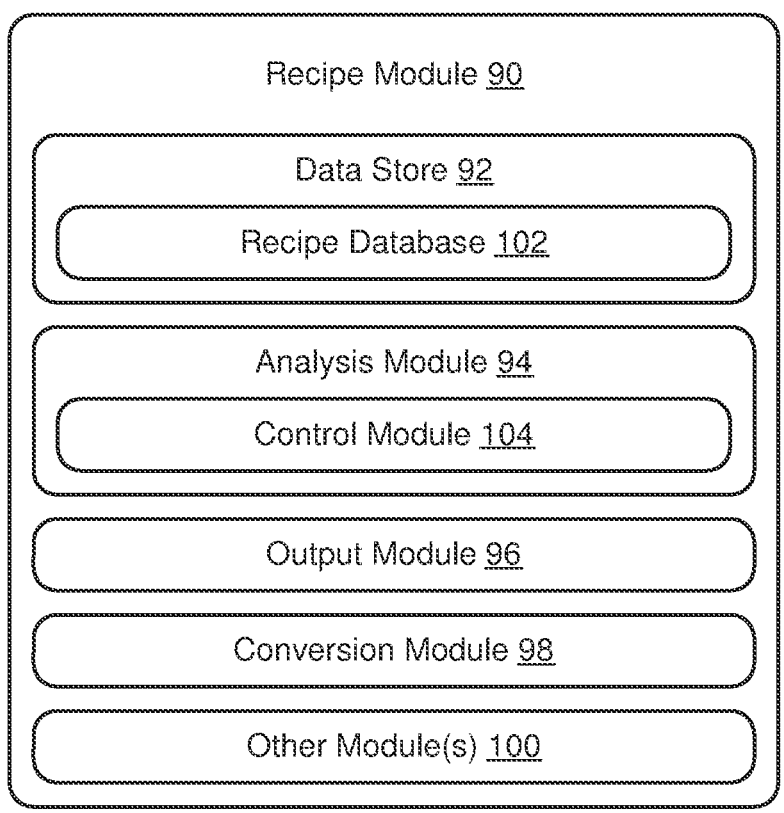
FIG. 6 is a schematic block diagram of one embodiment of a recipe module in accordance with the present invention.

Referring to FIG. 6, in selected embodiments, one or more computers, computers systems, mobile computing devices, or the like or a combination or sub-combination thereof may support or enable a recipe module 90. A recipe module 90 may enable certain receipt data 60 to be used when suggesting one or more recipes 10 to a corresponding customer. A recipe module 90 may include any suitable arrangement of sub-components or modules. In certain embodiments, a recipe module 90 may include a data store 92, analysis module 94, output module 96, conversion module 98 one or more other modules 100 as desired or necessary, or the like or a combination or sub-combination thereof.

A data store 92 may contain records supporting the operation of a recipe module 90. In selected embodiments, a data store 92 may contain one or more recipes 10. For example, a data store 92 may store one or more recipe databases 102, each of which may contain one or more collections 14 of recipes 10. Accordingly, a recipe module 90 may utilize or access a plurality of recipes 10 stored in electronic format.

An analysis module 94 may be programmed to analyze receipt data 60 corresponding to one or more customers in order to identify one or more recipes 10 contained in a data store 92 that are likely to be relevant to those customers. An analysis module 94 may perform such analysis and identifications in any suitable manner.

In selected embodiments, an analysis module 94 may analyze receipt data 60 to identify purchase patterns, cuisine preferences, or the like or combinations thereof. Purchase patterns may provide a "micro" or detailed view of the food products or items purchased. Cuisine preferences, on the other hand, may provide a "macro" or high level view of the types of food or cuisines preferred by a particular customer. Accordingly, an analysis module 94 may perform micro and/or macro analysis of receipt data 60

For example, in certain embodiments, receipt data 60 may be analyzed by an analysis module 94 at substantially exclusively the micro level to identify purchasing patterns. Once a purchasing pattern has been identified, it may be used in identifying one or more recipes 10 that correspond to the pattern. For example, by analyzing receipt data 60, an analysis module 94 may identify a purchase pattern wherein a particular customer purchases a statistically significant amount of pasta. Accordingly, an analysis module 95 may identify one or more recipes 10 that correspond at the micro level (e.g., call for pasta).

Alternatively, receipt data 60 may be analyzed at both the micro and macro levels. For example, receipt data 60 may be analyzed at a micro level in order to assign or determine one or more macro level characterizations. That is, certain products or items may correlate to particular cuisines. Pasta, for example, is closely associated with Italian cuisine. Accordingly, a purchase pattern wherein a particular customer purchases a statistically significant amount of pasta may be used as a micro level indicator of a macro level preference for Italian cuisine. An analysis module 94 may, therefore, identify one or more recipes 10 that correspond at the macro level (e.g., are directed to Italian cuisine).

Any suitable granularity or resolution may be applied or used by an analysis module 94 when identifying, selecting, or assigning micro and/or macro characterizations. In selected embodiments, the granularity or resolution may correspond to, follow, or match an ability of an analysis module 94 to resolve such differences. For example, in selected embodiments, certain macro preferences may simply be characterized as "Asian," "Italian", "Mexican," or the like. Alternatively, an analysis module 94 may differentiate to a higher degree (e.g., between a Chinese macro preference and one or more other Asian macro preferences or between a macro preference for Szechuan cuisine and one or more other regional cuisines within China).

Statistical significance may be determined in any suitable manner. In selected embodiments, statistical significance may correspond to the mere presence of a particular product or set of products within the receipt data 60. For example, the mere presence of a gluten-free flour substitute within receipt data 60 may justify an analysis module 94 in associating a macro level characterization of "gluten free" to the corresponding customer. Accordingly, the analysis module 94 may identify one or more recipes 10 that are gluten free.

Alternatively, or in addition thereto, statistical significance may correspond to one or more numeric characterizations. In selected embodiments, statistical significance may correspond to meeting, passing, or falling below a particular numeric threshold. For example, one or more purchases of a particular product or set of products may be statistically significant if they are greater than, equal to, or less than a particular percentage by weight and/or cost of one or more purchases.

For example, the purchase of ground beef may be statistically significant if, over some number of shopping trips, the amount spent on ground beef is greater than or equal to some percentage (e.g., 7%) of the total amount spent on food in those trips. When such is the case, an analysis module 94 may be programmed to select or assign a micro level characterization associated with ground beef to the corresponding customer. Accordingly, the analysis module 94 may identify one or more recipes 10 that are call for ground beef.

In another example, the absence of meat, milk, eggs, or other animal-derived products may be statistically significant if, over some number of shopping trips, the amount spent on such items is less than some percentage (e.g., 3%, 1%, or the like) of the total amount spent on food in those trips. When such is the case, an analysis module 94 may be programmed to select or assign a macro level characterization associated with vegetarianism, strict vegetarianism, veganism, or the like to the corresponding customer. Accordingly, the analysis module 94 may identify one or more recipes 10 that are vegetarian, strictly vegetarian, vegan, or the like.

In analyzing receipt data 60, an analysis module 94 may identify, select, or assign more than one characterization to a particular customer. For example, an analysis module 94 may identify and assign a micro level pattern associated with chicken as well as a macro level preference for Italian cuisine to a customer. Accordingly, in identifying one or more recipes 10 for the customer, an analysis module 94 may identify recipes 10 corresponding to the micro pattern (e.g., a recipe 10 for Chicken Cordon Bleu), macro preference (e.g., a recipe 10 for pasta primavera), or both the micro pattern and macro preference (e.g., a recipe 10 for chicken parmigiana).

In certain embodiments, an analysis module 94 may apply a methodology somewhat different from that described hereinabove. Accordingly, in selected embodiments, an analysis module 94 may utilize a less heuristic approach. For example, an analysis module 94 may use a full receipt history (e.g., a complete collection of receipt data 60 corresponding to a particular customer) as a training set or model that may be used to find new (e.g., other) food product or products the corresponding customer should like. The analysis module 94 may then find recipes 10 that contain the new food product or products. Thus, an analysis module 94 may use product recommendation techniques, then find the recipes 10 that contain the new products.

In selected embodiments, an analysis module 94 may include a control module 104. A control module 104 may provide a mechanism through which a customer may express his or her desire to see one or more suggested recipes 10. A control module 104 may also grant one or more customers some level of control over the recipes 10 identified by an analysis module 94 in their behalf. For example, a control module 104 may enable a customer to establish a black list, white list, or the like with respect to certain ingredients, dishes, cuisines (e.g., vegetarian, vegan), nutritional characteristics (e.g., low in sodium, low in fat), required skills or experience, or the like. An analysis module 94 may then consider and respect such inputs or preferences when identifying recipes 10.

In certain embodiments, a control module 104 may enable one or more customers to set, input, or otherwise communicate an experimentation setting. An experimentation setting may be a measure of how different one or more recipes 10 are from the purchase patterns and/or food preferences of a customer. In many situations, a customer may desire that an analysis module 94 identify recipes 10 that are closely associated with his or her purchase patterns or food preferences. However, in other situations, a customer may want to experience something new. Accordingly, this desire may be communicated via a control module 104.

For example, in selected embodiments, a control module 104 may present a "Try Something New" or "Surprise Me" bottom. Alternatively, a control module 104 may present a scale (e.g., a slider or the like). A first extreme of the scale may correspond to a tight correlation between purchase patterns, cuisine preferences, and recipes 10. A second, opposite extreme of the scale may correspond to a loose correlation (e.g., an opposite correlation, a cross correlation, or the like) between purchase patterns, cuisine preferences, and recipes 10. Accordingly, by selecting an appropriate location on the scale, a customer may communicate additional information that may be used by an analysis module 94 to identify relevant recipes 10.

For example, based on an experimentation setting proximate a first extreme, an analysis module 94 may identify one or more recipes 10 closely associated with the micro patterns and/or macro preferences of the corresponding customer. Based on an intermediate experimentation setting, an analysis module 94 may identify one or more recipes 10 less associated with the micro patterns and/or macro preferences of the corresponding customer. For example, an analysis module 94 may identify recipes 10 corresponding to certain macro preferences (e.g., a preference for Italian cuisine), but not certain micro patterns (e.g., disregarding a pattern of consuming chicken).

Alternatively, based on an experimentation setting proximate a second extreme, an analysis module 94 may identify one or more recipes 10 even less associated with the micro patterns and/or macro preferences of the corresponding customer. For example, an analysis module 94 may identify recipes 10 corresponding to certain micro preferences, but not certain macro patterns. Thus, if a customer has a micro pattern of purchasing beef and a macro preference for Italian cuisine, an analysis module 94 may identify one or more recipes 10 that contain beef, but do not correspond to Italian cuisine (e.g., that relate to Chinese cuisine). In such embodiments or situations, the commonality in a core ingredient may increase the likelihood that the customer will enjoy the corresponding dish, while the differences in cuisine may satisfy the customer's desire to try something new or out of the ordinary.

An output module 96 may support or enable the passing and presentation of one or more recipes 10 to appropriate customers. In passing and presenting recipes 10, an output module 96 may rely on the records contained with a data store 92. In selected embodiments or situations, an output module 96 may pass or present more than one recipe 10 to the various customers. Accordingly, a customer may scroll, swipe, pan, or otherwise progress through an array of potentially relevant recipes 10.

In selected embodiments or situations, a customer may desire to use a particular recipe 10 identified by an analysis module 94 and delivered by an output module 96. Such a desire may be accompanied by a need to shop for one or more of the ingredients associated with the recipe 10. Accordingly, the customers may desire to generate or modify a shopping list based on the recipe 10.

In certain embodiments, a recipe 10 may be tightly integrated with the products offered for sale by a particular retailer. Such recipes 10 may be considered to be product-specific. That is, the receipts 10 may refer or cite directly to one or more specific products sold by the particular retailer. Accordingly, a shopping list may be generated or modified directly from such recipes 10.

Alternatively, a recipe 10 may originate with an entity independent of any retailer or any products offered thereby. Such recipes 10 may be considered to be product-independent. That is, the receipts 10 may not refer or cite directly to one or more specific products sold by the particular retailer. A shopping list may not be generated or modified directly from such recipes 10. Accordingly, in selected embodiments, a recipe module 90 may include a conversion module 96 to convert one or more product-independent recipes 10 into one or more corresponding shopping lists, use one or more product-independent recipes 10 to modify an existing shopping list, and/or convert one or more product-independent recipes 10 into product-specific recipes 10.

In certain embodiments, a conversion module 98 may use fuzzy logic or the like to correlate one or more recited ingredients to one or more corresponding products sold by a particular retailer. For example, a recipe 10 may recite "½ cup sliced almonds." Comparing this recitation to certain products known to be sold by a particular retailer, a conversion module 98 may identify one or more suitable products. For example, a conversion module 98 may identify "DIAMOND Almonds, Sliced, 6-Ounce Bag." Accordingly, a conversion module 98 may cite the DIAMOND product in a corresponding shopping list or product-specific recipe 10.

The various functions or modules of a recipe module 90 may be enacted or implemented by any suitable system or component thereof. For example, in selected embodiments, one or more functions or modules of a recipe module 90 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 7:
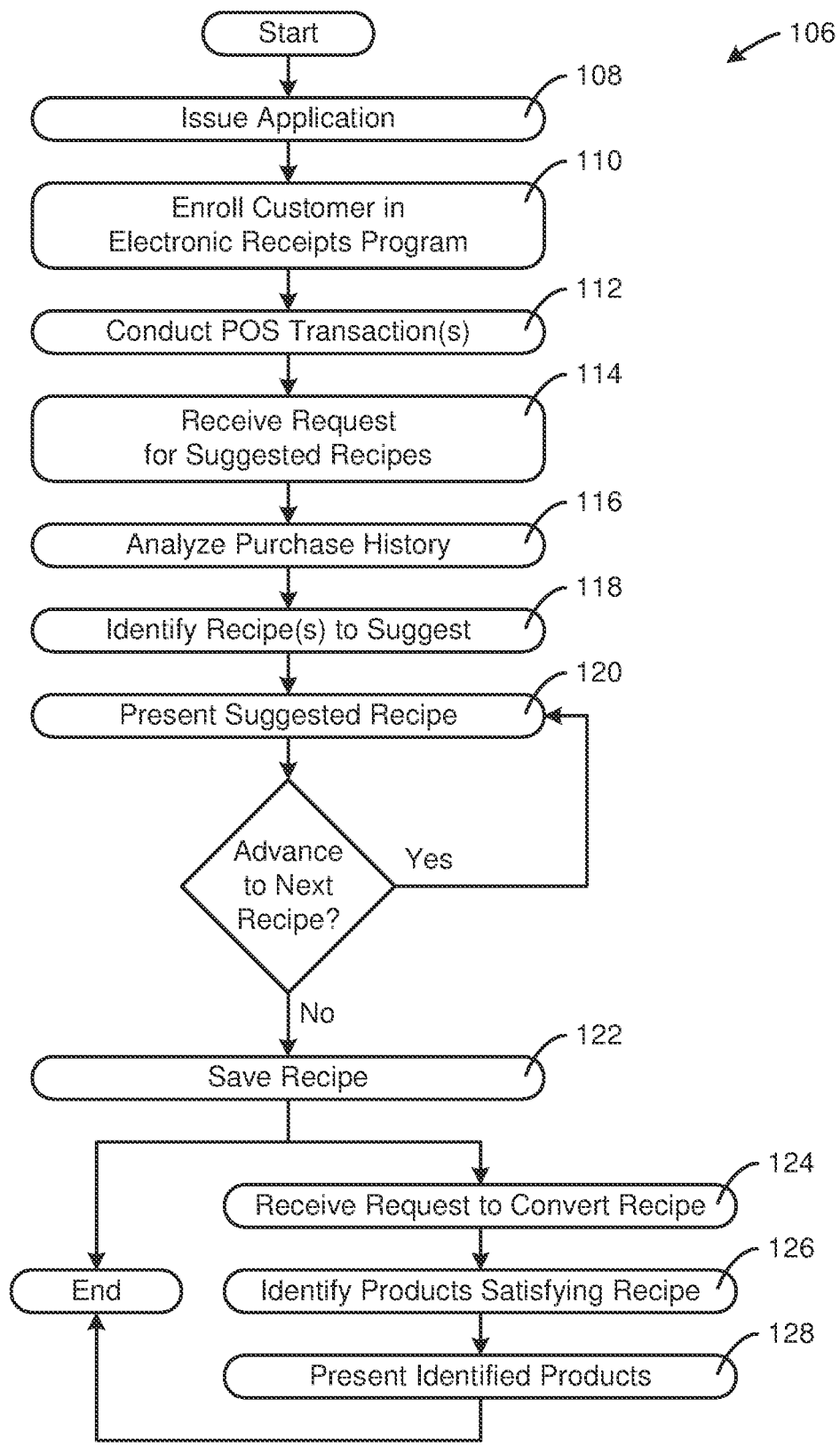
FIG. 7 is a block diagram of one embodiment of a method for suggesting one or more recipes in accordance with the present invention.

Referring to FIG. 7, one method 106 in accordance with the present invention may begin when an appropriate application (e.g., a retailer's mobile application, an electronic receipts application, or the like or a combination or subcombination thereof) is issued 108 and installed on a computing device of a customer. A computer system may then enroll 110 the customer in an electronic receipts program. In selected embodiments, this enrollment 110 may result in the computing device being linked to or associated with certain identification information within the records of a computer system.

So prepared, a customer may then enter a "brick-and-mortar" business location (e.g., enter a brick-and-mortar retail store with his or her computing device), select one or more items for purchase, and approach a POS system 22. At the POS system 22, a transaction (e.g., a purchase of one or more items) may be completed.

During the transaction, a computer system may receive identification information. For example, a POS system 22 may scan a membership card, club card, loyalty card, identification card, credit card, debit card, or the like. From the scan, identification information (e.g., a unique identification number, membership number, or the like) may be obtained. Alternatively, while a cashier is processing a transaction, a customer may be prompted via a card reader 32b, customer-facing display 32a, or the like to enter (e.g., type in using the card reader 32b) an identification number (e.g., a mobile telephone number).

Identification information may be passed from a POS system 22 to one or more other computers (e.g., servers 38, 48) within a computer system. The identification information may link a customer and a corresponding transaction to one or more records stored within a computer system. In selected embodiments, such records may contain the information necessary to identify and communicate with a computing device of the corresponding customer. Accordingly, a computer system may deliver receipt data 60 documenting the transaction to an appropriate computing device. In such a manner, one or more transactions may be completed 112.

At some point thereafter, a computer system may receive 114 (e.g., from a customer via an application running on the customer's computing device) a request for one or more suggested recipes 10. Accordingly, a computer system may analyze 116 the appropriate purchase history (e.g., receipt data 60 collected in one or more completed 112 transactions involving the corresponding customer), identify 118 one or more recipes 10 that are potentially relevant to the customer, and present 120 (e.g., via an application running on the customer's computing device) the one or more recipes 10 to the customer.

In selected embodiments, the one or more recipes 10 may be presented one at a time to the customer. For example, a first recipe 10 may be displayed or presented 120 first. In certain embodiments, a first recipe 10 may be the recipe 10 deemed most likely to be relevant to the customer. Should the customer wish to advance to another recipe 10, he or she may so indicate via an appropriate user interface. A second recipe 10 may then be presented 120. In selected embodiments, the second recipe 10 may match the projected relevance of the first recipe 10 or have a projected relevance less than that of the first recipe 10. Such a progression through the recipes 10 may continue until the customer finds a recipe 10 he or she would like to try, the database 102 or databases 102 of recipes 10 has been exhausted, or the customer abandons the search.

Should a customer elect to abandon a search, the method 106 may simply end. Alternatively, should a customer locate a recipe 10 he or she would like to try, the customer may so indicate by saving 122, selecting, bookmarking, or otherwise designating the recipe 10. Accordingly, the customer may easily refer to the recipe 10 in a future shopping trip, cooking event, or the like.

Once a customer has saved 122 or otherwise designating the appropriate recipe 10, the method 106 may end. Alternatively, in selected embodiments, a customer may wish to generate or modify a shopping list based on the selected recipe 10. Accordingly, a computer system may receive 124 (e.g., from a customer via an application running on the customer's computing device) a request to convert the selected recipe 10. The computer system may then identify 126 specific, commercially-available products corresponding to the ingredients listed in the recipe 10 and present 128 the identified products in the form a new or modified shopping list and/or product-specific recipe 10.

In selected embodiments, an analysis module 94 may learn from the interplay of a customer with one or more suggested recipes 10. For example, an analysis module 94 may note which recipes 10 received the most attention from, or were selected by, a customer. Accordingly, an analysis module 94 may analyze those recipes 10 to determine in any identifiable information, patterns, or preferences corresponding to the customer may be gleaned therefrom. Additionally, an analysis module 94 may analyze future receipt data 60 in an effort to determine whether a customer acted on a particular recipe 10. Thus, an analysis module 94 may monitor and improve its own performance.

The flowchart in FIG. 7 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. For example, in selected embodiments, the step or steps of analyzing 116 purchase history and/or identifying 118 recipes may occur before a request for suggest recipes 10 is received 114. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for suggesting recipes, the computer-implemented method comprising:
    identifying, by a computer system of a retailer during one or more point-of-sale transactions associated with a customer, a mobile computing device of the customer;
    delivering, by the computer system to the customer via a user interface executed on the mobile computing device, receipt data documenting the one or more point-of-sale transactions;
    receiving, by the computer system from the customer via the user interface executed on the mobile computing device, a request for a recipe;
    receiving, by the computer system via the user interface executed on the mobile computing device, a selection of one of adjustable experimentation settings by the customer;
    determining, by the computer system, one or more recipes in response to the request for the recipe, each of the one or more recipes having at least a threshold of computer-determined relevance to one or more food products purchased within the one or more point-of-sale transactions;
    generating, by the computer system, a user interface control to be displayed on the user interface executed on the mobile computing device;
    associating at least one photograph with the one or more recipes; and
    transmitting, by the computer system for display to the customer via the user interface executed on the mobile computing device, the one or more recipes and the at least one photograph,
    wherein:
    determining, by the computer system, the one or more recipes further comprises determining, by the computer system, the one or more recipes based, at least in part, on the selection;
    the user interface control comprises a correlation scale of the adjustable experimentation settings;
    the correlation scale comprises a slidable scale with multiple positions;
    each of the multiple positions on the slidable scale is configured to represent a different experimentation setting of the adjustable experimentation settings;
    the selection of the one of the adjustable experimentation settings occurs by the customer selecting one of the multiple positions on the slidable scale;
    the correlation scale is configured to indicate a correlation of a recipe of the one or more recipes with micro patterns of the customer and macro preferences of the customer;
    the micro patterns comprise one or more sale transaction patterns for the customer;
    the macro preferences comprise one or more categorized food types for the customer, determined through analysis of the micro patterns;
    the adjustable experimentation settings further comprise at least one out-of-the- ordinary experimentation setting corresponding to at least one of the micro patterns of the customer or the macro preferences of the customer; and
    determining, by the computer system, the one or more recipes based, at least in part, on the selection further comprises:
    excluding, by the computer system, from the one or more recipes any of the one or more recipes that is correlated to the at least one out-of-the-ordinary experimentation setting selected by the customer.

2. The computer-implemented method of claim 1, wherein the one or more recipes are product-specific recipes.

3. The computer-implemented method of claim 1, wherein the one or more recipes are product-independent recipes.

4. The computer-implemented method of claim 1, wherein determining the one or more recipes further comprises:
    removing, by the computer system, a first recipe from the one or more recipes upon a determination that no correlation exists between the first recipe and at least one of:
    the micro patterns of the customer;
    the macro preferences of the customer; or the selection of the one of the adjustable experimentation settings; and
    identifying, by the computer system, the one or more recipes as being potentially relevant to the customer.

5. The computer-implemented method of claim 1, further comprising:
    analyzing, by the computer system, the one or more point-of-sale transactions of the customer to identify the micro patterns of the customer and the macro preferences of the customer.

6. The computer-implemented method of claim 5, further comprising:
    identifying, by the computer system, a food item within the one or more point-of-sale transactions;
    determining, by the computer system, a statistical significance of the food item with respect to the one or more point-of-sale transactions;
    correlating, by the computer system, the food item with at least one of the micro patterns or at least one of the macro preferences of the customer upon a determination that the statistical significance of the food item exceeds a predetermined threshold; and
    omitting, by the computer system, the food item from the micro patterns and the macro preferences upon a determination that the statistical significance of the food item does not exceed the predetermined threshold.

7. The computer-implemented method of claim 1, further comprising:
    converting, by the computer system, a first recipe of the one or more recipes into a shopping list; and
    transmitting, by the computer system for display to the customer via the user interface executed on the mobile computing device, the shopping list.

8. The computer-implemented method of claim 7, wherein:
    converting the first recipe into the shopping list comprises applying, by the computer system, fuzzy logic to correlate one or more ingredients recited in the first recipe to one or more products purchasable from the retailer.

9. The computer-implemented method of claim 1, further comprising:
    modifying an existing shopping list of the customer based on a selected recipe of the one or more recipes.

10. The computer-implemented method of claim 1, wherein:
    excluding, by the computer system, from the one or more recipes any of the one or more recipes that is correlated to the at least one out-of-the-ordinary experimentation setting selected by the customer further comprises:
    excluding, by the computer system, from the one or more recipes any of the one or more recipes that is not correlated to an opposite preference of the micro patterns of the customer and the macro preferences of the customer; and the opposite preference is opposite to the at least one out-of-the-ordinary experimentation setting selected by the customer.

11. The computer-implemented method of claim 1, wherein:

the macro preferences further comprise a cuisine.

12. A computer system comprising:

one or more processors; and one or more memory devices operably connected to the one or more processors, wherein the one or more memory devices collectively store:

a receipt module programmed to deliver receipt data documenting one or more point-of-sale transactions to a computing device of a customer;

an analysis module programmed to:

identify one or more recipes having at least a threshold of computer-determined relevance to one or more food preferences; and associate at least one photograph with the one or more recipes;

a control module programed to:

receive, via a user interface executed on the computing device, a selection of one of adjustable experimentation settings by the customer; and generate a user interface control to be displayed on the user interface executed on the computing device; and an output module programmed to:

communicate the one or more recipes and the at least one photograph to the customer via the user interface executed on the computing device, wherein:

identifying the one or more recipes further comprises identifying the one or more recipes based, at least in part, on the selection;

the user interface control comprises a correlation scale of the adjustable experimentation settings;

the correlation scale comprises a slidable scale with multiple positions;

each of the multiple positions on the slidable scale is configured to represent a different experimentation setting of the adjustable experimentation settings;

the selection of the one of the adjustable experimentation settings occurs by the customer selecting one of the multiple positions on the slidable scale;

the correlation scale is configured to indicate a correlation of a recipe of the one or more recipes with micro patterns of the customer and macro preferences of the customer;

the micro patterns comprise one or more sale transaction patterns for the customer;

the macro preferences comprise one or more categorized food types for the customer, determined through analysis of the micro patterns;

the adjustable experimentation settings further comprise at least one out-of-the- ordinary experimentation setting corresponding to at least one of the micro patterns of the customer or the macro preferences of the customer; and identifying determining, by the computer system, the one or more recipes based, at least in part, on the selection further comprises:

excluding, by the computer system, from the one or more recipes any of the one or more recipes that is correlated to the at least one out-of-the-ordinary experimentation setting selected by the customer.

13. The computer system of claim 12, wherein the one or more recipes are product-specific recipes.

14. The computer system of claim 12, wherein the one or more recipes are product-independent recipes.

15. The computer system of claim 12, wherein:

the analysis module is further programed to identify the one or more recipes by:

removing a recipe from the one or more recipes upon a determination that no correlation exists between the recipe and at least one of:

the micro patterns of the customer;

the macro preferences of the customer; or the selection of the one of the adjustable experimentation settings; and identifying the one or more recipes as being potentially relevant to the customer.

16. The computer system of claim 12, wherein:

the analysis module is further programed to analyze the one or more point-of-sale transactions of the customer to identify the micro patterns of the customer and the macro preferences of the customer.

17. The computer system of claim 16, wherein:

the analysis module is further programed to:

identify a food item within the one or more point-of-sale transactions;

determine a statistical significance of the food item with respect to the one or more point-of-sale transactions;

correlate the food item with at least one of the micro patterns or at least one of the macro preferences of the customer upon a determination that the statistical significance of the food item exceeds a predetermined threshold; and omit the food item from the micro patterns and the macro preferences upon a determination that the statistical significance of the food item does not exceed the predetermined threshold.

18. The computer system of claim 12, further comprising:

a conversion module programmed to:

convert a first recipe of the one or more recipes into a shopping list, wherein:

the output module is further programmed to communicate the shopping list to the customer via the user interface executed on the computing device.

19. The computer system of claim 18, wherein:

the conversion module is further programmed to:

apply fuzzy logic to correlate one or more ingredients recited in the first recipe to one or more products purchasable from a retailer; and converting the first recipe into the shopping list comprises listing the one or more products.

20. The computer system of claim 12, further comprising:

a conversion module programmed to:

modify an existing shopping list of the customer based on a selected recipe of the one or more recipes.

21. The computer system of claim 12, wherein:

excluding, by the computer system, from the one or more recipes any of the one or more recipes that is correlated to the at least one out-of-the-ordinary experimentation setting selected by the customer further comprises:

excluding, by the computer system, from the one or more recipes any of the one or more recipes that is not correlated to an opposite preference of the micro patterns of the customer and the macro preferences of the customer; and the opposite preference is opposite to the at least one out-of-the-ordinary experimentation setting selected by the customer.

22. The computer system of claim 12, wherein:

the macro preferences further comprise a cuisine.

\* \* \* \* \*